United States Patent [19]

Bier et al.

[11] 4,176,224
[45] Nov. 27, 1979

[54] POLY (ETHYLENE/ALKYLENE) TEREPHTHALATES WHICH CRYSTALLIZE RAPIDLY

[75] Inventors: Peter Bier; Rudolf Binsack; Hugo Vernaleken, all of Krefeld, Fed. Rep. of Germany

[73] Assignee: Bayer Aktiengesellschaft, Leverkusen, Fed. Rep. of Germany

[21] Appl. No.: 889,584

[22] Filed: Mar. 23, 1978

[30] Foreign Application Priority Data

Apr. 9, 1977 [DE] Fed. Rep. of Germany ........ 2715932

[51] Int. Cl.$^2$ .............................................. C08G 63/18
[52] U.S. Cl. ................................ 528/309; 264/176 R; 264/176 F; 528/298; 528/302; 528/305; 528/307
[58] Field of Search ................................ 528/309, 305

[56] References Cited

U.S. PATENT DOCUMENTS

| 3,692,744 | 9/1972 | Rich et al. ................... 264/328 X |
| 3,934,067 | 1/1976 | Goldman et al. .............. 428/290 |
| 4,086,212 | 4/1978 | Bier et al. ...................... 528/309 X |

FOREIGN PATENT DOCUMENTS 2507674 9/1976 Fed. Rep. of Germany.
2507776 9/1976 Fed. Rep. of Germany.

OTHER PUBLICATIONS

Wilfong, *J. Polym. Sci.*, 54, (1961), pp. 385–410.
Abraham et al., *Chemical Abstracts*, vol. 82:59,347q (1975).

*Primary Examiner*—Walter C. Danison
*Attorney, Agent, or Firm*—Gene Harsh; Lawrence S. Pope

[57] ABSTRACT

The present invention is concerned with thermoplastic terephthalic acid copolyesters which crystallize more rapidly than homopolyethylene terephthalate and are based on a diol component which is about 98 to 99.9 mol % of ethylene glycol and the balance 2-ethylhexane-1,3-diol. The acid component may be up to about 10.0 mol % of other than terephthalic acid or its dimethyl ester.

This invention is also concerned with a process of synthesizing such copolyesters by esterifying or transesterifying the acid and diol components between about 150° and 250° C. in the presence of appropriate catalysts. The condensation product may be subject to polycondensation at about 200° to 300° C. under reduced pressure in the presence of esterification catalysts. In a preferred embodiment the 2-ethylhexane-1,3-diol is added after the initial reaction between the acid component and the ethylene glycol and preferably after the degree of polycondensation is greater than 4.

13 Claims, No Drawings

POLY (ETHYLENE/ALKYLENE) TEREPHTHALATES WHICH CRYSTALLIZE RAPIDLY

FIELD OF THE INVENTION

The present invention relates to highly crystalline thermoplastic copolyesters which crystallize rapidly and are based on terephthalic acid radicals, ethylene glycol radicals and 2-ethylhexane-1,3-diol radicals.

BACKGROUND OF THE INVENTION

Polyalkylene terephthalates have acquired considerable importance as raw materials for the production of fibers, films and molded articles. Because of their partially crystalline structure, they have outstanding properties, such as high abrasion resistance, favorable creep characteristics and high dimensional accuracy, and are therefore particularly suitable for the production of moldings subjected to severe mechanical and thermal conditions. An additional improvement in the mechanical properties can be achieved by incorporating reinforcing materials, for example, glass fibers (British Patent Specification No. 1,111,012; U.S. Pat. No. 3,368,995 and DT-AS (German published specification) No. 2,042,447).

Because of its special physical properties, polyethylene terephthalate is particularly suitable for the production of fiber products and films. However, the need for high mold temperatures (about 140° C.) and relatively long press times is a disadvantage in the production of molded articles, which is only partially compensated by extraordinary rigidity and high heat stability under load. Polypropylene terephthalate and polybutylene terephthalate indeed require shorter press times and lower mold temperatures (about 100° C.) than polyethylene terephthalate, since they crystallize considerably more rapidly, but compared with polyethylene terephthalate they have poorer physical properties, in particular a lower heat stability under load.

There has been no lack of endeavors to provide polycondensates which have a combination of the good properties both of polyethylene terephthalate and of polypropylene terephthalate and polybutylene terephthalate. Thus, it is known, for example, that the tendency towards crystallization of polyethylene terephthalate can be improved by nucleation with finely divided, solid inorganic substances (Dutch patent specification No. 6,511,744).

Highly crystalline, thermoplastic terephthalic acid copolyesters which crystallize rapidly and consist of at least 90 mol %, relative to the dicarboxylic acid component, of terephthalic acid radicals, 90 to 99.5 mol %, relative to the diol component, of ethylene glycol radicals and 0.5 to 10 mol %, relative to the diol component, of co-diol radicals, characterized in that (a) the co-diols employed carry two primary OH groups, (b) these two OH groups are separated by 3 or 4 C atoms and (c) the co-diols employed are either unsubstituted, mono-alkyl-substituted or dialkyl-substituted, the alkyl groups carrying 2 or 3 C atoms and the sum of the C atoms of the alkyl substituents being at least 4 in the case of substitution, are known from DT-OS (German published specification) No. 2,507,674 and U.S. patent application Ser. No. 658,816, filed Feb. 17, 1976.

Examples of suitable co-diols which may be mentioned are propane-1,3-diol, butane-1,4-diol and 2,2-diethylpropane-1,3-diol.

Highly crystalline, thermoplastic terephthalic acid copolyesters which crystallize rapidly and consist of at least 90 mol %, relative to the dicarboxylic acid component, of terephthalic acid radicals, 90 to 99.5 mol %, relative to the diol component, of ethylene glycol radicals and 0.5 to 10 mol %, relative to the diol component, of co-diol radicals, characterized in that (a) the co-diols employed carry at least one secondary or tertiary OH group, (b) the co-diols employed contain 4 to 10 C atoms and (c) the two OH groups are separated by 3 to 4 C atoms, are known from DT-OS (German published specification) No. 2,507,776 and U.S. patent application Ser. No. 658,817, filed Feb. 17, 1976.

Examples of suitable co-diols which may be mentioned are, in particular, butane-1,3-diol, hexane-2,5-diol, 2,2,4-trimethylpentane-1,3-diol and 2- and 3-methylpentane-2,4-diol.

Both the German Offenlegungsschriften (German Published Specifications) cited disclose that the tendency towards crystallization of the polyethylene terephthalates is not reduced by incorporating the specifically defined co-diols, but is significantly increased.

SUMMARY OF THE INVENTION

It has now been found, surprisingly, that the tendency towards crystallization of polyethylene terephthalates can be still further increased by modifying a small proportion of the ethylene glycol radicals by means of 2-ethylhex-1,3-yl radicals, so that the polyethylene terephthalates modified according to the invention have a rate of crystallization which is even more similar to that of polybutylene terephthalate.

High crystallinity ensures hardness, dimensional stability and stability of shape even at relatively high temperatures. This high crystallinity should be achieved as rapidly as possible so that an optimum level of the properties is obtained. In addition, the injection cycle, the length of which also determines the profitability of the process, depends on the mold dwell time.

The present invention thus relates to highly crystalline, thermoplastic terephthalic acid copolyesters which crystallize rapidly and consist of at least about 90 mol %, relative to the dicarboxylic acid component, of terephthalic acid radicals, about 98 to 99.9, preferably about 98.5–99.9, and especially about 99.0–99.7, mol %, relative to the diol component, of ethylene glycol radicals and about 0.1 to 2, preferably about 0.1 to 1.5, and especially about 0.3 to 1.0, mol %, relative to the diol component, of co-diol radicals, characterized in that the co-diol radicals are 2-ethylhexane-1,3-diol radicals.

DETAILED DESCRIPTION OF THE INVENTION

The polycondensates according to the invention crystallize considerably more rapidly than pure polyethylene terephthalate, and even more rapidly than the copolyesters according to DT-OS (German published specification) Nos. 2,507,674 and 2,507,776, and have a very high melting point, that is to say, they have a combination of properties which is very desirable and has not been achieved by the terephthalic acid esters known hitherto.

In addition to terephthalic acid radicals, the polyesters according to the invention can contain up to about 10 mol %, relative to the acid component, of radicals of other aromatic or even aliphatic dicarboxylic acids (or of their dimethyl esters), such as, for example, phthalic acid, isophthalic acid, naphthalene-2,6-dicarboxylic acid, diphenyl-4,4'-dicarboxylic acid, adipic acid, sebacic acid and cyclohexanediacetic acid.

The polyesters according to the invention can, of course, be branched by trihydric or tetrahydric alcohols or tribasic or tetrabasic acids, such as is described, for example, in DT-OS (German published specification) No. 1,900,270 (=U.S. Pat. No. 3,692,744). Suitable branching agents are, for example, trimesic acid, pyromellitic acid, trimethylolpropane, trimethylolethane and pentaerythritol. It is advisable to employ not more than about 1 mol %, relative to the acid component, of branching agents.

The copolyesters according to the invention can be prepared in a known manner by esterifying or transesterifying the dicarboxylic acids, preferably pure terephthalic acid, and/or the corresponding dimethyl esters with about 1.05–5.0, preferably about 1.4–3.6, mols of the diols, relative to 1 mol of the dicarboxylic acid component, in the presence of esterification and/or trans-esterification catalysts between about 150° and 250° C. (reaction step A) and subjecting the reaction products thus obtained to a polycondensation reaction under customary conditions, that is to say, in the presence of esterification catalysts between about 200° and 300° C. under reduced pressure (<1 mm Hg) (reaction step B).

The invention thus further relates to a process for the preparation of the terephthalic acid copolyesters according to the invention, according to which 1 mol of terephthalic acid and/or terephthalic acid dimethyl ester, which can be replaced to the extent of up to about 10 mol %, relative to the dicarboxylic acid component, by other aromatic or aliphatic dicarboxylic acids or their dimethyl esters, is esterified or trans-esterified with about 1.05 to 5.0 mols of diols, which consist of ethylene glycol to the extent of about 98 to 99.9 mol %, relative to the diol component, and of 2-ethylhexane-1,3-diol to the extent of about 0.1 to 2.0 mol %, relative to the diol component, in a manner which is in itself known in the presence of esterification and/or trans-esterification catalysts between about 150° and 250° C., and the reaction products thus obtained are subject to a polycondensation reaction in the presence of esterification catalysts between about 200° and 300° C. under reduced pressure.

A particularly preferred embodiment consists in admixing the 2-ethylhexane-1,3-diol to the reaction mixture as late as possible, that is to say only after the reaction of terephthalic acid, or of its ester-forming derivatives, with ethylene glycol to give bis-(2-hydroxyethyl) terephthalate has taken place or, even more advantageously, only after a polyethylene terephthalate prepolymer which has a degree of polymerization of more than 4 (number-average) has formed. Thereafter, the mixture can be subjected to a polycondensation reaction in the customary manner, as described above.

Both the first step (A) and the second step (B) of the condensation reaction are carried out in the presence of catalysts, such as are described, for example, by R. E. Wilfong in J. Polym, Sci. 54, 385 (1961). Some of these catalysts are effective accelerators for the esterification reaction (A) and others are effective accelerators for the polycondensation reaction (B), while yet others are fairly effective catalysts for both (C).

The catalysts which are suitable for accelerating the 1st reaction stage (A) include 1. lithium, sodium, potassium, calcium, strontium and boron in the form of the metals, oxides, hydrides, formates, acetates, alcoholates or glycollates;
2. calcium chloride and bromide and strontium chloride and bromide;
3. tertiary amines;
4. calcium malonate, adipate and benzoate and the like and strontium malonate, adipate and benzoate and the like; and
5. lithium salts of dithiocarbamic acids.

Suitable catalysts (B) for catalyzing the polycondensation step are, for example 1. molybdenum, germanium, lead, tin and antimony in the form of the metals, oxides, hydrides, formates, alcoholates or glycollates;
2. zinc perborate and borate and lead perborate and borate;
3. zinc succinate, butyrate, adipate or enolate of a diketone, mangenese-II succinate, butyrate, adipate or enolate of a diketone, cobalt succinate, butyrate, adipate or enolate of a diketone, magnesium succinate, butyrate, adipate or enolate of a diketone, chromium succinate, butyrate, adipate or enolate of a diketone, iron succinate, butyrate, adipate or enolate of a diketone and cadmium succinate, butyrate, adipate or enolate of a diketone;
4. zinc chloride and bromide;
5. lanthanum dioxide and titanate;
6. neodymium chloride;
7. mixed salts of antimony, such as, for example, potassium antimony tatrate, and salts of antimonic acids, such as potassium pyroantimonate;
8. zinc salts or manganese salts of dithiocarbamic acids;
9. cobalt naphthenate;
10. titanium tetrafluoride or tetrachloride;
11. alkyl orthotitanate;
12. titanium tetrachloride-ether complexes;
13. quaternary ammonium salts which carry a titaniumhexaalkoxy radical; titanium tetraalkoxides, alkali metal compounds of aluminium alkoxides, zirconium alkoxides or titanium alkoxides or alkaline earth metal compounds of aluminum alkoxides, zirconium alkoxides or titanium alkoxides;
14. organic quaternary ammonium, sulphonium, phosphonium and oxonium hydroxides and salts;
15. barium malonate, adipate, benzoate and the like;
16. lead salts, zinc salts, cadmium salts or manganese salts of the monoalkyl ester of phenylenedicarboxylic acid;
17. antimony-catechol complexes with an aminoalcohol or with an amine and an alcohol; and
18. uranium trioxide, tetrahalide, nitrate, sulphate or acetate.

Suitable catalysts C for accelerating both reaction steps are, for example 1. barium, magnesium, zinc, cadmium, aluminum, manganese or cobalt in the form of the metals, oxides, hydrides, formates, alcoholates, glycollates or, preferably, acetates;
2. aluminum chloride and bromide; and
3. zinc succinate, butyrate, adipate or enolate of a diketone, manganese-II succinate, butyrate, adipate or enolate of a diketone, cobalt succinate, butyrate, adipate or enolate of a diketone, magnesium succinate, butyrate, adipate or enolate of a diketone, chromium succinate, butyrate, adipate or enolate of a diketone, iron succinate, butyrate, adipate or enolate of a diketone and cadmium succinate, butyrate, adipate or enolate of a diketone.

The compounds which are most suitable as catalysts A are calcium salts, zinc salts and manganese salts, in particular the acetates.

The catalysts B which are most suitable are the compounds of zinc, manganese, cobalt, antimony, germanium, titanium and tin, such as, for example, zinc acetate and manganese acetate, antimony trioxide, trichloride and triacetate and germanium dioxide and tetrachloride.

The most suitable catalysts C are, in particular, titanium compounds, such as, for example, titanic acid tetraalkyl esters having alkyl groups with 1–10 C atoms, such as tetraisopropyl titarate and tetrabutyl titanate.

The catalysts can be employed in amounts of about 0.001 to 0.2% by weight, relative to the dicarboxylic acid component.

Thereafter, inhibitors, such as are described, for example, by H. Ludewig, Polyesterfasern (Polyester Fibres), 2nd edition, Akademie-Verlag, Berlin 1974, can be added in order to inhibit the A type catalysts after the 1st reaction step has ended and to increase the stability of the end product. Examples of such inhibitors are phosphoric acid, phosphorous acid and their aliphatic, aromatic or araliphatic esters, for example alkyl esters with 6 to 18 C atoms in the alcohol component, or phenyl esters, the phenyl radicals of which are optionally substituted by 1–3 substituents with 6 to 18 C atoms, such as tris-nonylphenyl phosphate, dodecylphenyl phosphate or triphenyl phosphate. These inhibitors are usually employed in amounts of about 0.01 to 0.6% by weight, relative to the dicarboxylic acid component.

In order to achieve an even higher molecular weight, the poly(ethylene/2-ethylhex-1,3-yl) terephthalates can be subjected to a solid phase polycondensation reaction. For this, the granular product is usually subjected to a polycondensation reaction in the solid phase in a stream of nitrogen or in vacuo under a pressure of 1 mm Hg and at a temperature which is about 60°–6° C. below the polymer melting point.

In order to provide protection against thermo-oxidative degradation, the customary amounts, preferably about 0.001 to 0.5% by weight, relative to the non-filled and non-reinforced copolyesters, of stabilizers can be added to the copolyesters according to the invention. Suitable stabilizers are, for example, phenols and phenol derivatives, preferably sterically hindered phenols which contain alkyl substituents with 1–6 C atoms in both the o-positions relative to the phenolic hydroxyl group, amines, preferably secondary arylamines and their derivatives, phosphates and phosphites, preferably aryl derivatives thereof, quinones, copper salts of organic acids and addition compounds of copper- I halides with phosphites, such as, for example, 4,4'-bis-(2,6-di-tert.-butylphenol), 1,3,5-trimethyl-2,4,6-tris-(3,5-di-tert.-butyl-4-hydroxy-benzyl)-benzene, 4,4'-butylidene-bis-(6-tert.-butyl-m-cresol), 3,5-di-tert.-butyl-4-hydroxy-benzyl-phosphonic acid diethyl ester, N,N'-bis-(β-naphthyl)-p-phenylenediamine, N,N'-bis-(1-methyl-heptyl-p-phenylenediamine, phenyl-β-naphthylamine, 4,4'-bis-(α, α-dimethylbenzyl)-diphenylamine, 1,3,5-tris-(3,5-di-tert.-butyl-4-hydroxy-hydrocinnamoyl)-hexahydro-s-triazine, hydroquinone, p-benzoquinone, toluhydroquinone, p-tert.-butylpyrocatechol, chloranil, naphthoquinone, copper naphthenate, copper octoate, Cu-I-Cl/triphenyl phosphate, Cu-I Cl/trimethyl phosphite, Cu-I Cl/tris-chloroethyl phosphite, Cu-I Cl/tripropyl phosphite and p-nitroso-dimethylaniline.

The thermoplastic copolyesters according to the invention can be reinforced with reinforcing substances. Metals, silicates, carbon and glass, mainly in the form of fibers, fabrics or mats, have proved suitable reinforcing substances. Glass fibers are the preferred reinforcing material.

In addition, if desired, inorganic or organic pigments, dyestuffs, lubricants and release agents, such as zinc stearate, montan waxes, UV light absorbers and the like can be added in the customary amounts.

In order to obtain flame-resistant products, about 2 to 20% by weight, relative to the thermal copolyester, of flameproofing agents which are in themselves known, for example halogen-containing organic compounds, elementary phosphorus or phosphorus compounds, phosphorus -nitrogen compounds or antimony trioxide, or mixtures of these substances, preferably antimony trioxide, decabromodiphenyl ether and tetrabromobisphenol A polycarbonate, can be added.

The rate of crystallization of the copolyesters according to the invention can be further increased, for the injection molding, by adding about 0.01 to 1% by weight, relative to the non-filled and non-reinforced copolyesters, of nucleating agents. Suitable nucleating agents are compounds known to those skilled in the art, such as are described, for example, in Kunststoff-Handbuch (Plastics Handbook), Volume VIII, "Polyester" ("Polyesters"), Carl Hanser Verlag, Munich, 1973, page 701.

The copolyesters according to the invention are excellent starting materials for the preparation of films and fibers, and preferably for the production of molded articles of all types by injection molding, in particular for the production of glass-filled molded articles by injection molding.

EXAMPLES 1–3

80 kg (412.1 mols) of dimethyl terephthalate are transesterified with 92 kg (1,482.2 mols) of ethylene glycol in the presence of 22.4 g of manganese acetate for 3 hours at 200° C. After the transesterification has ended, 28.8 g of $GeO_2$ and the appropriate amount of 2-ethylhexane-1,3-diol are added. The temperature is then kept at 230° C. for 2 hours and at 250° C. for 1.5 hours. Thereafter, it is increased to 275° C. and at the same time the apparatus is evacuated (<1.0 mm Hg). After a further 3–4 hours, the polycondensation reaction has ended. The melt is then spun off through a waterbath and granulated.

The injection mold of a gearwheel ($\phi$ 40 mm), in which the injection-mold article was forced out of the mold by four ejector pins, was used to determine the processing cycle time which could be achieved. The injection cycle in which the ejector pins just no longer penetrated into the finished injection-molded article and the injection-molded article fell out of the mold without difficulty was determined.

Examples 1–3, Table 1, show the mold dwell times and the total injection cycle times of the poly(ethylene/2-ethylhex-1,3-yl) terephthalates according to the invention, compared with the poly(ethylene/2-ethylhex-1,3-yl) terephthalates which are outside the range of the invention, and with polyethylene terephthalate which is prepared analogously but is non-modified.

Table 1

| Example | Co-diol type | Amount (mol %) | Cylinder temperature (°C.) | Mold temperature (°C.) | Mold dwell time (seconds) | Total Injection molding cycle (seconds) |
|---|---|---|---|---|---|---|
| 1 | 2-ethylhexane-1,3-diol | 0.6 | 270 | 130 | 10 | 19.5 |
| 2 | 2-ethylhexane-1,3-diol | 2.5 | 270 | 130 | >60 | >69.5 |
| 3 | — | — | 270 | 140 | 30 | 39.5 |

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A highly crystalline, thermoplastic terephthalic acid copolyester which crystallizes rapidly and consists of at least about 90 mol %, relative to the dicarboxylic acid component, of terephthalic acid radicals, about 98 to 99.9 mol %, relative to the diol component, of ethylene glycol radicals and about 0.1 to 2.0 mol %, relative to the diol component, of 2-ethylhexane-1,3-diol radicals.

2. The highly crystalline, thermoplastic terephthalic acid copolyester of claim 1, which has about 98.5 to 99.9 mol %, relative to the diol component, of ethylene glycol radicals.

3. The highly crystalline, thermoplastic terephthalic acid copolyester of claim 2, which has about 99.0 to 99.7 mol %, relative to the diol component, of ethylene glycol radicals.

4. The highly crystalline, thermoplastic terephthalic acid copolyester of claim 1, containing up to about 10 mol %, relative to the acid component of a radical selected from the residues of phthalic acid,/isophthalic acid, naphthalene-2,6-dicarboxylic acid, diphenyl-4,4'-dicarboxylic acid, adipic acid, sebacic acid and cyclohexanediacetic acid.

5. A process for the production of thermoplastic terephthalic acid copolyesters which crystallize more rapidly than polyethylene terephthalate homopolymer comprising (1) esterifying or transesterifying an acid component consisting of
   (a) at least about 90 mol % of terephthalic acid and dimethyl terephthalic acid ester, and
   (b) up to about 10 mol % of other aliphatic and aromatic dicarboxylic acids and acid esters with
(2) about 1.05 to 5.0 equivalents of a diol component consisting of
   (a) about 98 to 99.9 mol % of ethylene glycol, and
   (b) about 0.1 to 2.0 mol % of 2-ethylhexane-1,3-diol at
(3) a temperature of between about 150° and 250° C. in the presence of esterification or transesterification catalysts, and
(4) polycondensing the initial reaction products at a temperature between about 200° and 300° C. under reduced pressure in the presence of an esterification catalyst.

6. The process of claim 5 wherein the 2-ethylhexane-1,3-diol is added to the reaction mixture after substantially all of the acid component has been reacted to di(2-hydroxyethyl)ester.

7. The process of claim 6 wherein the codiol is added to the reacton mixture after formation of a polyethylene terephthalate prepolymer with a degree of polymerization greater than 4 but before the polycondensation step.

8. The process of claim 5 wherein the acid component is substantially all terephthalic acid and dimethyl terephthalate.

9. The process of claim 5 wherein between about 1.4 and 3.6 equivalents of diol component are used per equivalent of acid component.

10. A film, fiber or injection molded article formed from the thermoplastic terephthalic acid copolyester of claim 1.

11. An injection molded article formed from the thermoplastic terephthalic acid copolyester of claim 1.

12. The product of the process of claim 6.

13. The product of the process of claim 7.

* * * * *